Nov. 15, 1960  F. S. LEVISON  2,960,110
NOISE DAMPENER
Filed Sept. 25, 1959
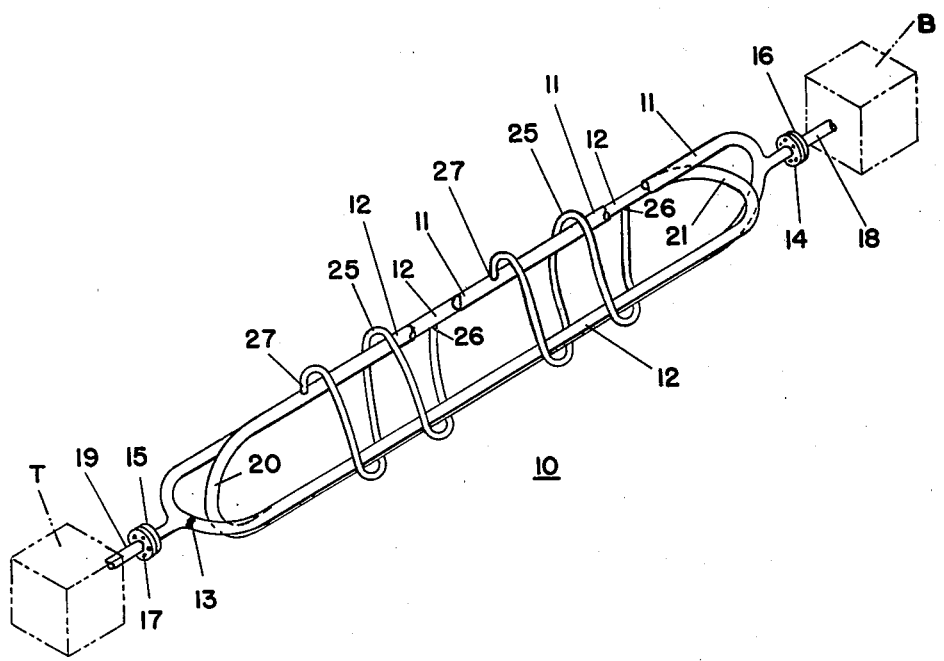
INVENTOR.
FLOYD S. LEVISON
BY
*J. F. Sheehan*
ATTORNEY 2,960,110
Patented Nov. 15, 1960

2,960,110
NOISE DAMPENER

Floyd S. Levison, 833 Pinewood Terrace,
Falls Church, Va.

Filed Sept. 25, 1959, Ser. No. 842,541

5 Claims. (Cl. 137—561)

(Granted under Title 35, U.S. Code (1952), sec. 266)

The invention described herein may be manufactured and used by or for the Government of the United States of America for governmental purposes without the payment of any royalties thereon or therefor.

This invention relates to fluid conduit systems and in particular is concerned with an improved flexible connection or expansion joint located in the fluid system to absorb vibrational shock or other movements of equipment located in the system for dampening or suppressing noises.

This invention is intended particularly for use with shipboard machinery installations, since it tends to reduce or eliminate the transmission of noises resulting from the vibrational or shock effects of the machinery and its associated fluid supply and removal conduits. It is the usual practice to mount machinery of naval vessels on resilient or cushioning foundations for the purpose of noise suppression due to vibration or shock stresses of the machinery. However it is known that these vibrational or shock stresses are transmitted from the machinery through the fluid piping, or conduit systems which supplies fluid to or removes fluid from the machinery and cause noises to resound throughout the vessel.

The resulting noises present an especial problem in that they are transmitted from a vessel as sound waves through the water and are readily detectable by an enemy submarine. In order to suppress, absorb or reduce the noise effects caused by the machinery such as fluid turbines, pumps, boilers, etc., used on the naval vessels, it is proposed that the device of this invention be located at various critical zones in a fluid conveying system, particularly in zones down stream of the machinery elements or after each probable source of vibration or shock in various types of fluid systems, such as steam, water, oil or air.

One object of the invention is to modify fluid conveying systems which are subjected to physical movements in manner to suppress noises resulting from such physical movements.

Another object is to provide in a fluid conduit system a device for absorbing vibrational or other movements in the system.

Another object is to provide an expansion joint for connection in a fluid conveying system which occupies a minimum of space but is effective to absorb vibrational or expansive movements.

For a detailed explanation of the invention reference should be made to the single figure of the drawing which is a perspective view of the device connected in a portion of a fluid conveying system. In the figure, the details of the device are shown in full lines connected between two machinery elements, which are shown in phantom lines, as representative of one critical zone or zone where vibration or shock could occur.

The noise suppressor or expansion joint is shown generally at 10 and is formed of two endless tubes or continuous tubular members or loops 11 and 12 which are interlocked or linked together. For example, one of the members 12 is shown as having a weld connection 13 after it has been interlocked with the endless tube 11. In the drawing, the tubular member 11 is shown broken in its top leg portion for the purpose of clarifying the positional relationship between the tubular members 11 and 12. The endless tube 11 has a connecting flange 14 which may be considered the inlet end of the joint while the endless tube 12 has a connecting flange 15 which may be considered the outlet end of the joint aligned with and opposed to the inlet end of tube 11. The flanged ends are used for ready connection to other flanges 16 and 17 on conduits 18 and 19 which represent parts of machinery to be interconnected. The expansion ends of the tubes 11 and 12 are respectively indicated at 20 and 21. The conduits 18 and 19 are shown as leading respectively to a boiler B and a turbine T which are exemplary of equipment with which the invention may be used.

The endless tubes 11 and 12 are disposed in telescoping relation, that is, they are relatively arranged so that one is movable within the other. However, this movement is limited to the degree necessary to take up or absorb the physical movement of the equipment to which either or both of the endless tubes are connected. For example, in the arrangement shown in the drawing the endless tube 11 could move in accordance with any vibrational movement of the boiler B and the endless tube 12 could move in accordance with any vibrational movement of turbine T and any expansive movement of the conduits 18 and 19 connecting these members with the endless tubes 11 and 12 would probably be reflected in the relative positions of the tubes 11 and 12.

The endless tubes or loops are relatively disposed as shown in the drawings with their expansion ends 20 and 21 positioned adjacent but in spaced relation with the respective opposite inlet and outlet ends of the tubes. Additionally, the tubes are interconnected by means of a plurality of cross-over tubes 25. The cross-over tubes 25 are of substantially smaller diameter than the endless tubes 11 or 12 and each is generally in the form of a helix having one end 26 connected to one endless tube and its other end 27 connected to the other endless tube. The number of cross-overs 25 which are required will depend on their diameters relative to the diameter of the endless tubes 11 or 12 since for best results the total cross-sectional area of the cross-overs should be substantially equal to the overall cross-sectional area of one of the endless tubes in order to maintain a constant fluid flow. In addition to maintaining the fluid flow constant, the cross-overs 25 are designed to provide a springing action to also function to maintain the endless tubes in their relative positions. That is, any movement of the endless tubes 11 and 12 is taken up by the springlike cross-over tubes 25 and the endless tubes 11 and 12 will return to their original relative position when the vibrational or other movement ceases.

Preferably, as is shown in the figure, the tubes 11 and 12 will be elongate and disposed normal or at right angles to each other. However, it is to be understood that the endless tubes may take other shapes and be constructed elliptical or annular. Also, it will be apparent from the figure that the connection or joint 10 may be mounted between two machinery elements, both of which are subjected to vibrational or other movement or it may be used between machinery elements, only one of which is subjected to vibrational or other movement.

Although only a single embodiment of the present invention has been illustrated and described, it will be apparent to those skilled in the art that various changes and modifications may be made to the present disclosure without departing from the spirit of the invention or from the scope of the appended claims.

I claim:
1. A noise dampening device for a fluid system which comprises a first continuous fluid conveying tube having an inlet for fluid and a second continuous conveying tube having an outlet for fluid, said conveying tubes being interlocked with said inlet and outlet disposed in aligned and opposed relationship, a plurality of helical tubes of smaller diameter than said conveying tubes, each of said helical tubes having one end connected to the first conveying tube and its other end connected to the second conveying tube positioning said conveying tubes in general telescoping relation and permitting relative longitudinal movement therebetween.

2. A noise dampening device for a fluid system which comprises a first continuous fluid conveying tube having an inlet for connection to one machine located in the fluid system and a second continuous conveying tube having an outlet for connection to a second machine located in the fluid system, said conveying tubes being interlocked with said inlet and outlet disposed in aligned and opposed relationship, a plurality of helical tubes of smaller diameter than said conveying tubes, each of said helical tubes having one end connected to the first conveying tube and its other end connected to the second conveying tube positioning said conveying tubes in general telescoping relation and permitting relative longitudinal movement therebetween.

3. A noise dampening device for a fluid system which comprises a first endless fluid conveying tube having an inlet for fluid and a second endless conveying tube having an outlet for fluid, said conveying tubes being interlocked with said inlet and outlet disposed in aligned and opposed relationship, a plurality of helical springlike tubes of smaller diameter than said conveying tubes, each of said helical tubes having one end connected to the first conveying tube and its other end connected to the second conveying tube positioning said conveying tubes in general telescoping relation and permitting relative movement therebetween.

4. A noise dampening device for a fluid system which comprises a first endless fluid conveying tube having an inlet for fluid and a second endless conveying tube having an outlet for fluid, said conveying tubes being of the same diameter and linked together in telescoping relation, said inlet and outlet disposed in aligned and opposed relationship, a plurality of helical tubes each being of smaller diameter than said conveying tubes and having an overall diameter equal to that of one of the conveying tubes, each of said helical tubes being springlike and having one end connected to one end of the first conveying tube and its other end connected to the second conveying tube permitting longitudinal movement between the conveying tubes.

5. A noise dampening device for a fluid system which comprises a first continuous elongate fluid conveying tube having an inlet end portion and an expansion end portion and a second continuous elongate conveying tube having an outlet end portion and an expansion end piston, said conveying tubes being linked together with said end portions disposed in aligned and opposed relationship, a plurality of helical tubes of smaller diameter than said conveying tubes, each of said helical tubes being springlike and having one end connected to one end of the first conveying tube and its other end connected to the second conveying tube and said helical tubes positioning the conveying tubes in general telescoping relation and at a right angle to each other.

References Cited in the file of this patent
UNITED STATES PATENTS
2,474,554   Stephens  --------------- June 28, 1949
FOREIGN PATENTS
431,305   Great Britain ------------ July 4, 1935